(12) United States Patent
Sakamoto et al.

(10) Patent No.: US 11,182,575 B2
(45) Date of Patent: Nov. 23, 2021

(54) WEARABLE ELECTRONIC DEVICE

(71) Applicant: CASIO COMPUTER CO., LTD., Tokyo (JP)

(72) Inventors: Kazuya Sakamoto, Kawasaki (JP); Yoshiaki Mochizuki, Hamura (JP); Ryo Oe, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/663,776

(22) Filed: Oct. 25, 2019

(65) Prior Publication Data
US 2020/0134275 A1   Apr. 30, 2020

(30) Foreign Application Priority Data

Oct. 26, 2018   (JP) .............................. JP2018-202361

(51) Int. Cl.
*G06K 7/10* (2006.01)
*G06K 7/14* (2006.01)

(52) U.S. Cl.
CPC ....... *G06K 7/10891* (2013.01); *G06K 7/1413* (2013.01); *G06K 2007/10534* (2013.01)

(58) Field of Classification Search
CPC ............. G06K 7/10891; G06K 7/1413; G06K 2007/10534; G06K 7/10396; G06K 7/10722; G06K 7/10881
See application file for complete search history.

(56) References Cited

U.S. PATENT DOCUMENTS

| | | | |
|---|---|---|---|
| 5,319,185 A | 6/1994 | Obata | |
| 5,514,861 A | 5/1996 | Swartz et al. | |
| 9,122,276 B2* | 9/2015 | Kraimer | B66F 9/07581 |
| 2014/0249944 A1 | 9/2014 | Hicks et al. | |
| 2016/0259958 A1 | 9/2016 | Nara et al. | |
| 2019/0196535 A1* | 6/2019 | Paufler | G06F 3/0346 |

FOREIGN PATENT DOCUMENTS

| | | |
|---|---|---|
| JP | 2936896 B2 | 6/1992 |
| JP | 5655698 B2 | 12/2014 |
| WO | 2015125317 A | 8/2015 |

OTHER PUBLICATIONS

Extended European Search Report (EESR) dated Mar. 11, 2020 issued European Application No. 19202103.8.

\* cited by examiner

*Primary Examiner* — Sonji N Johnson
(74) *Attorney, Agent, or Firm* — Holtz, Holtz & Volek PC

(57) ABSTRACT

A wearable electronic device includes:
a reading section configured to read optical information;
a display section configured to display information read by the reading section; and
a mounting section having at least a part formed of a flexible member and configured to support the display section and the reading section,
wherein the mounting section is wearable to an arm and is configured to be capable of fixing the display section to a radius of a forearm and the reading section to a back of a hand or a back of a finger.

14 Claims, 9 Drawing Sheets

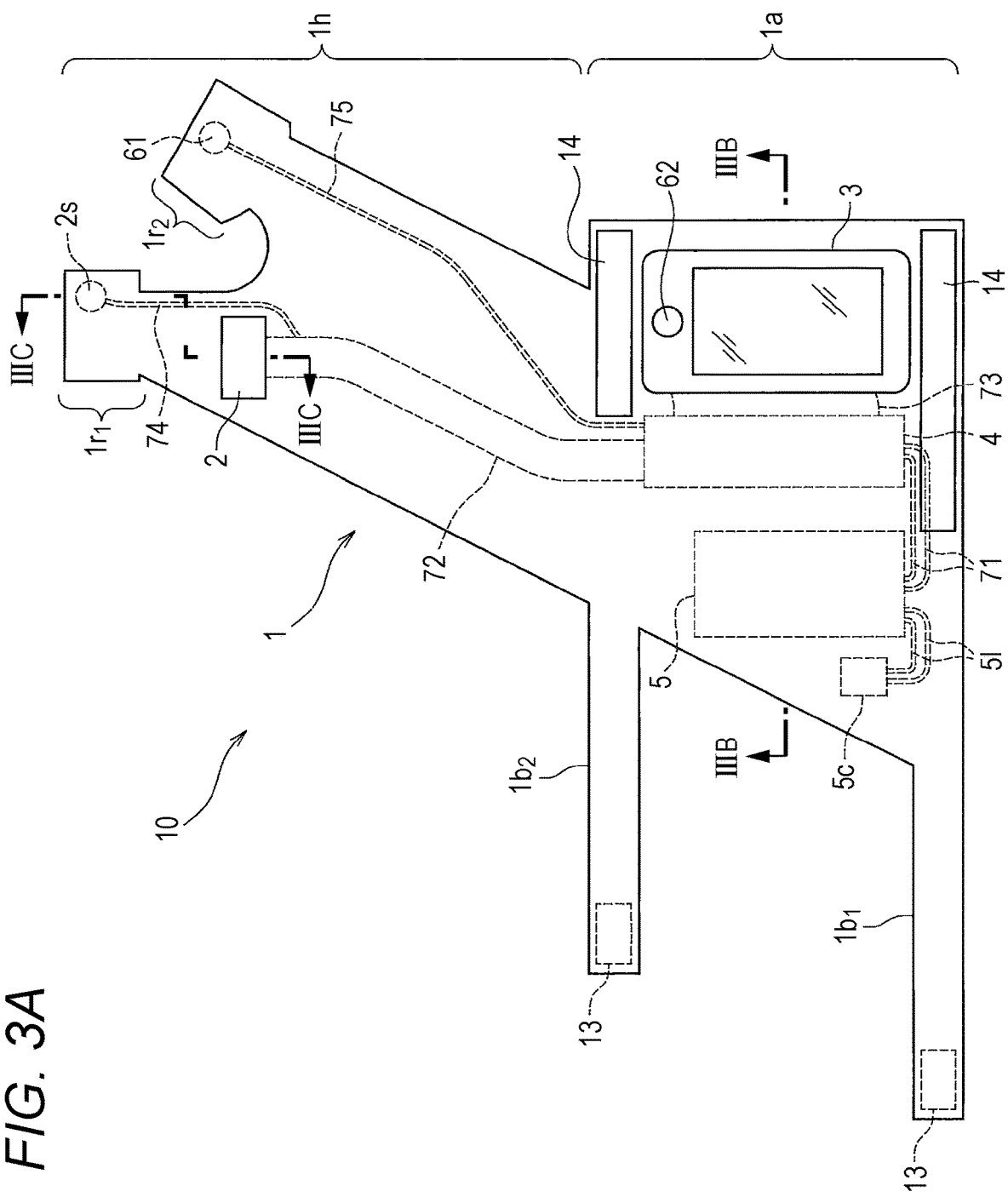

WEARABLE ELECTRONIC DEVICE

BACKGROUND

1. Technical Field

The present invention relates to a wearable electronic device.

2. Related Art

Portable reading devices (code readers), which read barcodes and two-dimensional (2D) codes and send the information thereof to a host computer, and the like, have been widely used for management of cargo, products, and goods in a transportation industry, a manufacturing industry, a retail industry, and the like. Furthermore, wearable reading devices, which can be worn on a user's wrist or finger such that both hands are free, have been developed. A wearable reading device is worn on a wrist close to the back a hand like, for example, a head (main body) of a wrist watch, so as to enable the user to visually recognize read code information, and includes a scanner (camera) imaging a code and a display screen on a side surface close to a finger and an upper surface, respectively (for example, WO 2015/125317 A). In another reading device, a scanner is separated to be attached to the back side of a finger (for example, JP 2936896 B2). Yet another reading device includes a display screen that is long and large along a forearm from a wrist, has one end in the longitudinal direction fixed to the wrist close to the back side of a hand, and includes a scanner on a side surface close to an ulna (a little finger) on the wrist. Alternatively, there is a configuration in which a scanner is provided on a side surface close to a fingertip such that one end in the longitudinal direction is pivotally supported and the scanner is rotated by 90° to face a subject (for example, JP 5655698 B2).

Since the reading devices described in WO 2015/125317 A and JP 2936896 B2 has the display screen corresponding to the area of a watch dial at most, the amount of information that can be simultaneously displayed is small. Since the display screen is arranged on the wrist close to the back of the hand, it is difficult for the user to visually recognize the display screen in a state where the scanner faces the subject, and it is difficult to confirm the read code information immediately. Since the reading device described in JP 5655698 B2 is supported on a band having one end in the longitudinal direction wound around the wrist, stability decreases when the size is increased. For example, it is necessary to bend an elbow such that the forearm is substantially parallel to a front surface of a body in order to cause the scanner to face the front subject, and the number of motions required for an operation increases. In addition, it is difficult to confirm the read code information immediately similarly to the cases of WO 2015/125317 A and JP 2936896 B2.

SUMMARY

To solve above problems, a wearable electronic device according to the present invention includes:

a reading section configured to read optical information;

a display section configured to display information read by the reading section;

a mounting section having at least a part formed of a flexible member and configured to support the display section and the reading section, wherein the mounting section is wearable to an arm and is configured to be capable of fixing the display section to a radius of a forearm and the reading section to a back of a hand or a back of a finger.

BRIEF DESCRIPTION OF THE DRAWINGS

FIG. 3A is a plan view schematically illustrating the configuration of the wearable electronic device according to the embodiment of the present invention;

DETAILED DESCRIPTION

Figure 1:
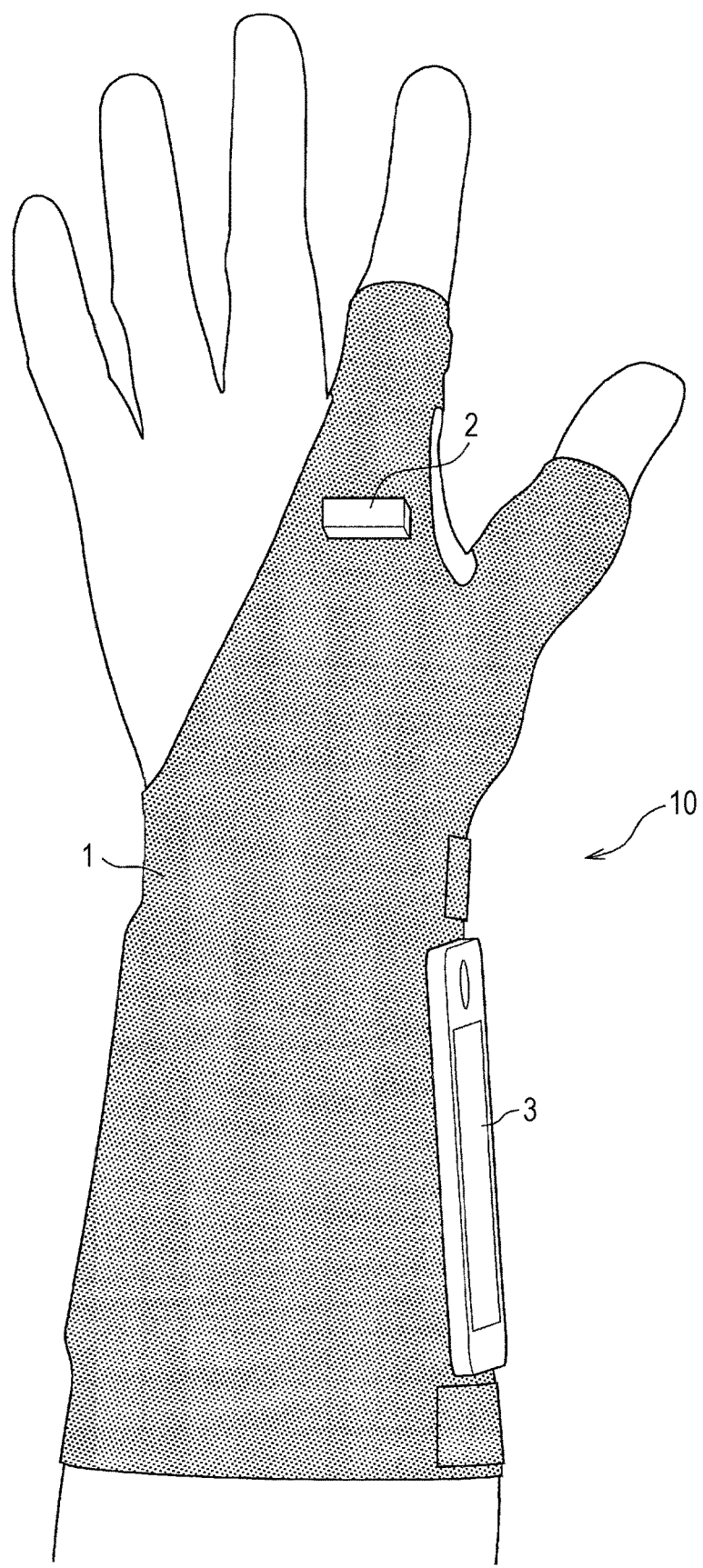
FIG. 1 is an external view when a wearable electronic device according to an embodiment of the present invention is worn.

Hereinafter, a mode for carrying out the present invention will be described in detail with reference to the respective drawings. However, the following mode illustrates a wearable electronic device for embodying a technical idea of the present embodiment, and is not limited to the following description. Members to be illustrated in the drawings sometimes exaggerate sizes, positional relationships, and the like and simplify shapes in order to clarify the description. In the following description, the same or similar members and steps will be denoted by the same reference signs, and will not be described as appropriate.

[Reading Device]

Figure 2:
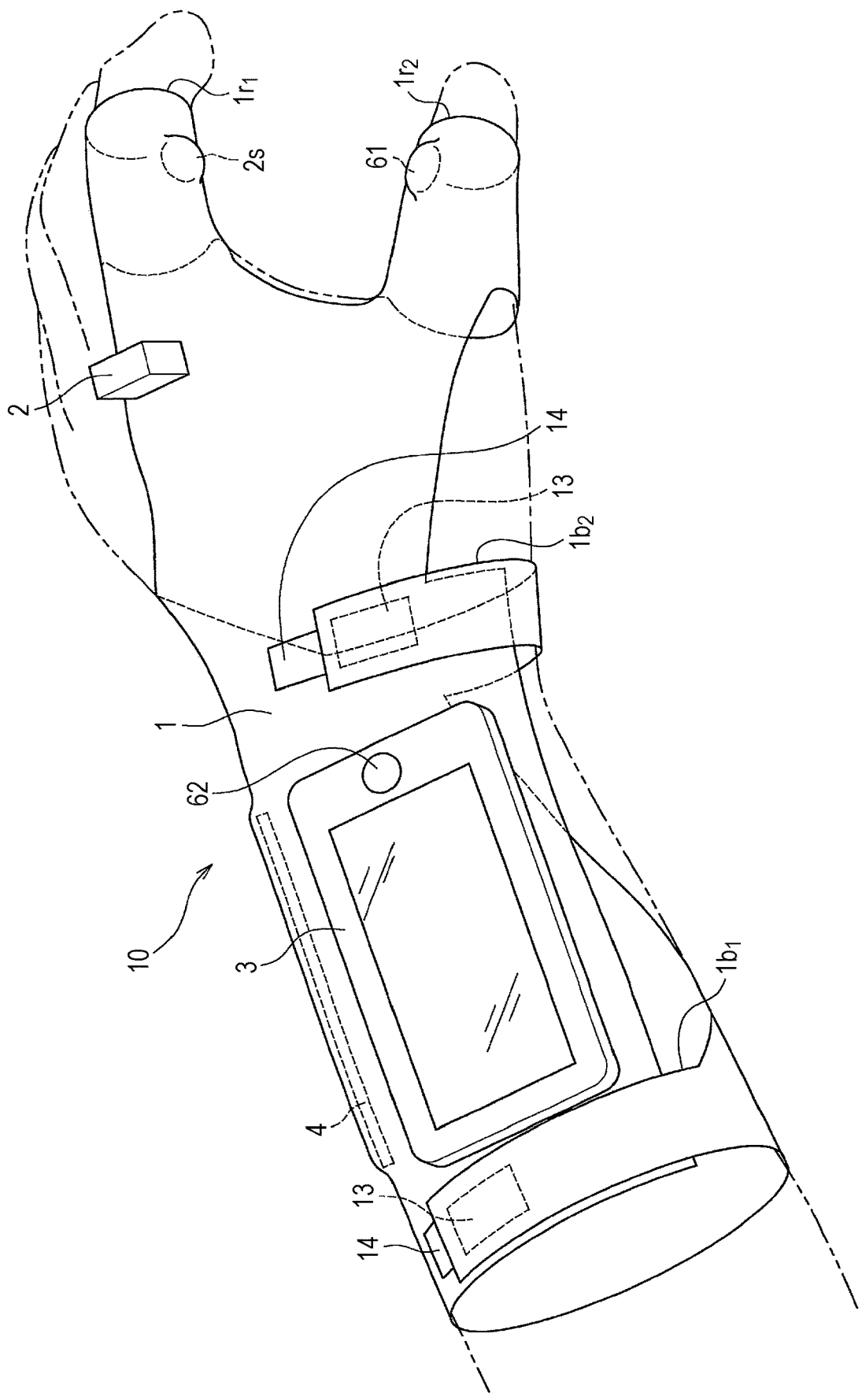
FIG. 2 is an external view schematically illustrating a configuration of the wearable electronic device according to the embodiment of the present invention.
Figure 3B:
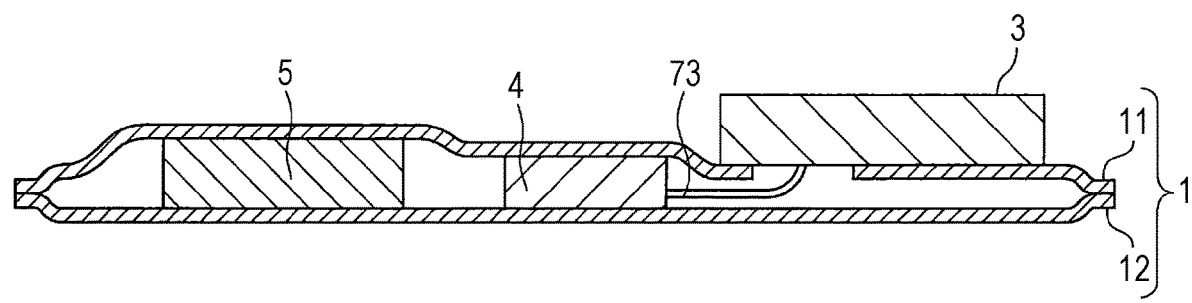
FIG. 3B is a schematic view illustrating the configuration of the wearable electronic device according to the embodiment of the present invention, and is a cross-sectional view taken along line IIIB-IIIB in FIG. 3A.
Figure 3C:
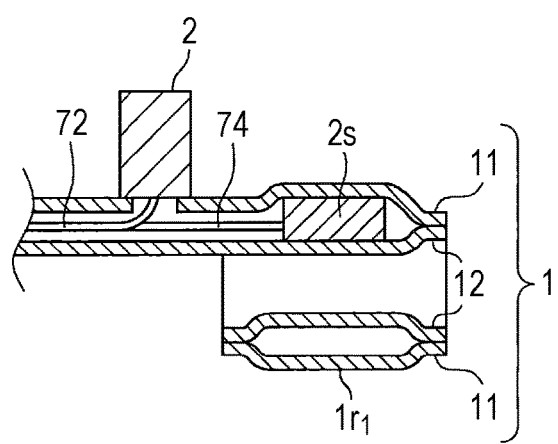
FIG. 3C is a schematic view illustrating the configuration of the wearable electronic device according to the embodiment of the present invention, and is a partial cross-sectional view taken along line IIIC-IIIC in FIG. 3A.
Figure 4:
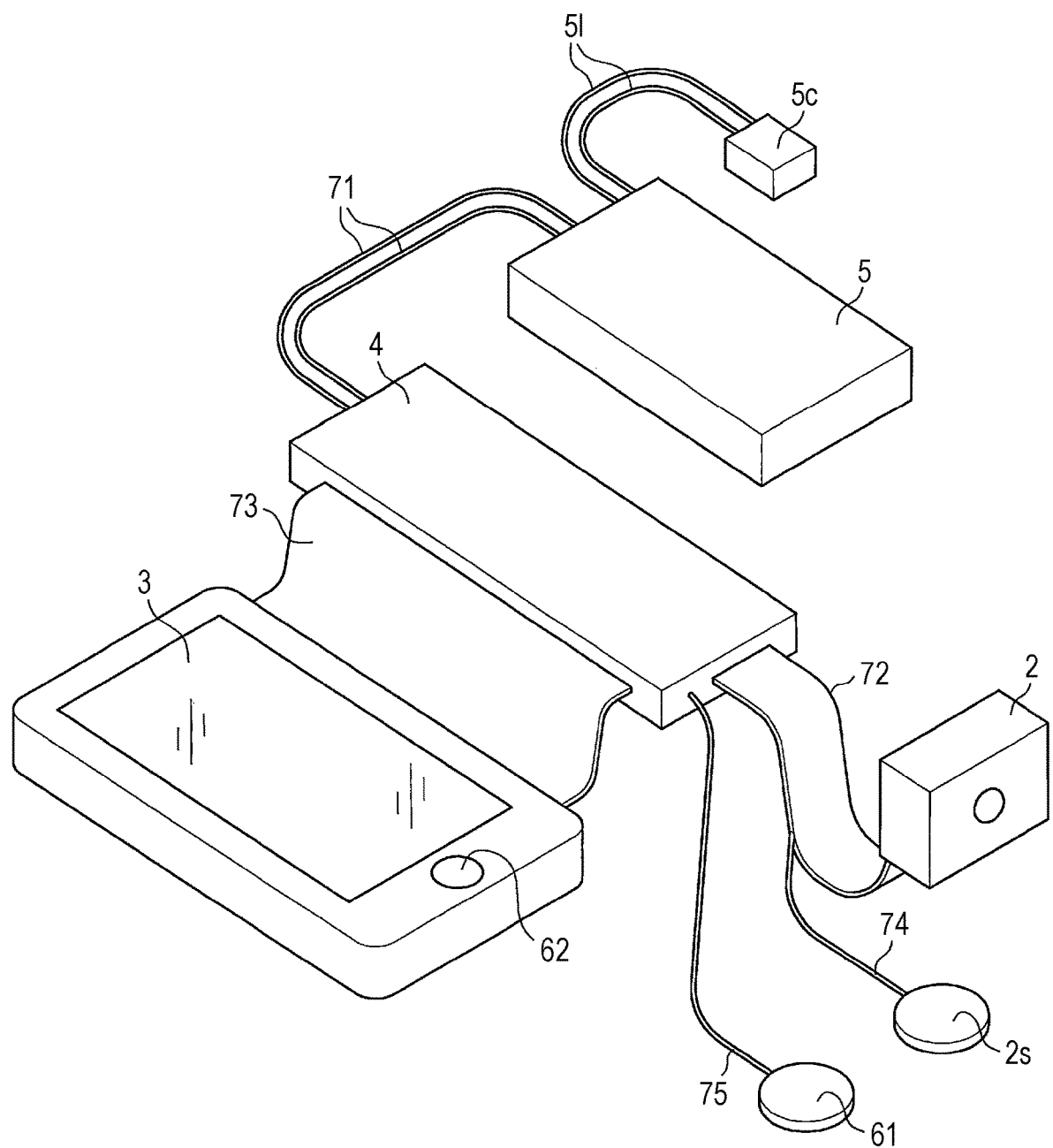
FIG. 4 is an external view for describing a configuration of the main part of the wearable electronic device according to the embodiment of the present invention.
Figure 5:
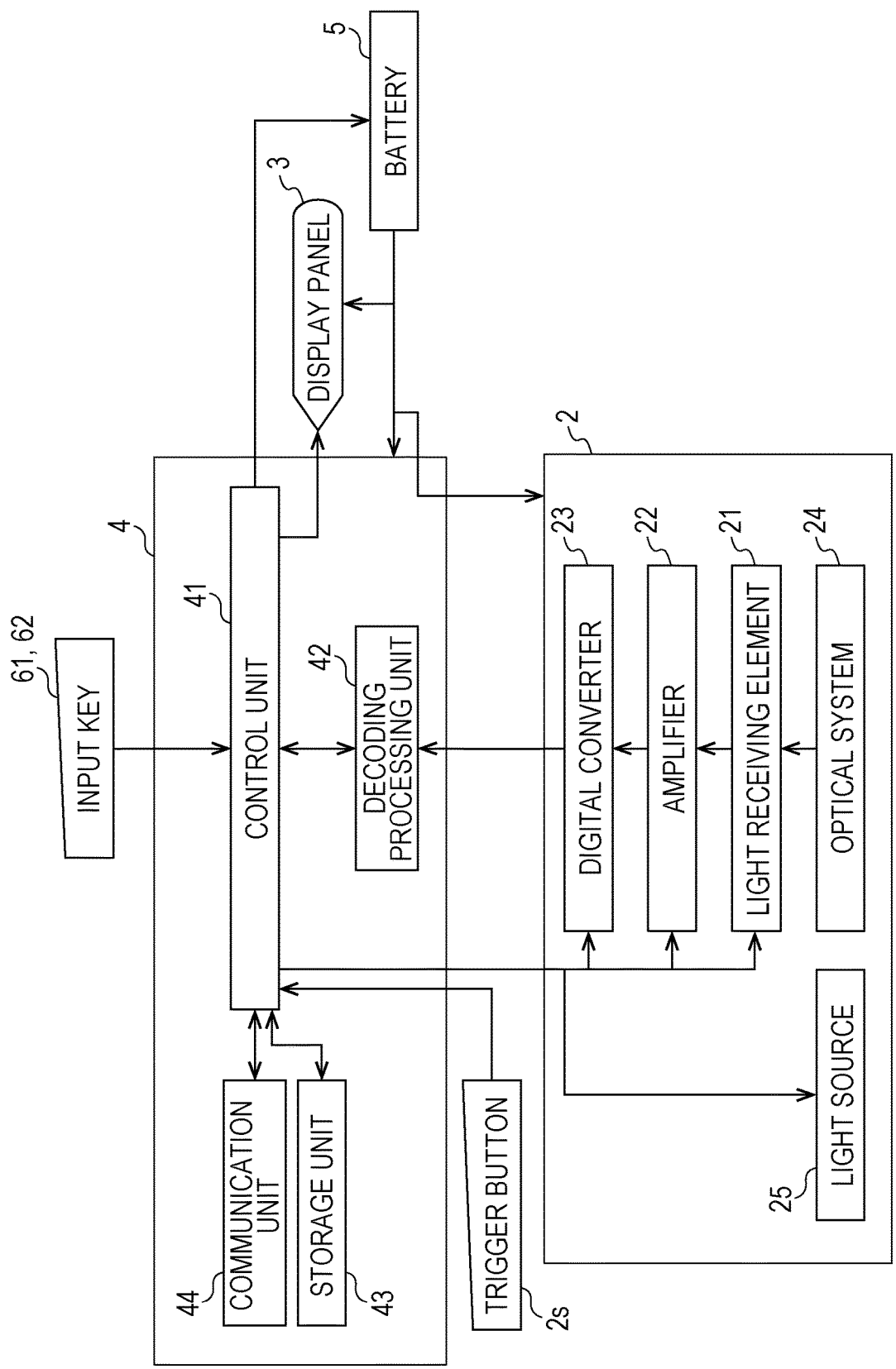
FIG. 5 is a block diagram illustrating the configuration of the wearable electronic device according to the embodiment of the present invention.

A configuration of a wearable electronic device according to an embodiment of the present invention will be described with reference to FIGS. 1, 2, 3A, 3B, 3C, 4, and 5. FIG. 1 is an external view when a wearable electronic device according to an embodiment of the present invention is worn. FIG. 2 is an external view schematically illustrating a configuration of the wearable electronic device according to the embodiment of the present invention. FIGS. 3A, 3B, and 3C are schematic views illustrating the configuration of the wearable electronic device according to the embodiment of the present invention, FIG. 3A is a plan view, FIG. 3B is a cross-sectional view taken along line IIIB-IIIB in FIG. 3A, and FIG. 3C is a partial cross-sectional view taken along line IIIC-IIIC in FIG. 3A. FIG. 4 is an external view for describing a configuration of the main part of the wearable electronic device according to the embodiment of the present invention. FIG. 5 is a block diagram illustrating the configuration of the wearable electronic device according to the embodiment of the present invention.

As illustrated in FIGS. 1 and 2, a reading device (wearable electronic device) 10 according to the embodiment of the present invention is used by being worn on user's arm, specifically from a left forearm to a finger, and includes a scanner (reading section) 2, a display panel (display section) 3, and a mounting body (mounting section) 1 configured to support the scanner and the display panel on the front side. The reading device 10 further includes an input key 62 on the display panel 3, and includes an electronic circuit board 4 with built-in trigger button 2s, finger portion input key 61, and control unit 41 (see FIG. 5), a battery (power supply unit) 5, and wiring 71, 72, 73, 74, and 75 as illustrated in FIGS. 3A, 3B, 3C, and 4 inside the mounting body 1. In the present specification, the reading device is a code reader that reads optical information such as a barcode and converts the read optical information into digital data. That is, the reading device 10 captures an image including image information (optical information) on a barcode or a two-dimensional code printed on a label attached to an article (cargo, a product, or a commodity), visualize the article information obtained by decoding the image information and notify the user of the visualized information, and is transmitted to a host computer or a management server (not illustrated) as necessary. Therefore, it can be said that the reading device 10 is a portable information terminal (handy terminal) having a code reader function.

(Mounting Body)

The mounting body 1 is a component configured to cause the reading device 10 to be worn on the user's arm, and has a long glove shape without fingers as illustrated in FIGS. 1 and 2. In addition, the mounting body 1 is a support body that supports the other components of the reading device 10 (see FIG. 4), and at least a part thereof is a two-layer (double) structure in which the electronic circuit board 4 and the battery 5 are accommodated between layers. Specifically, the mounting body 1 covers a portion about ⅔ of the back of a hand close to a thumb, a wrist, and a forearm excluding a part of the inner side (palm side) from each metacarpophalangeal joint of the thumb (first finger) and an index finger (second finger), and a portion covering a terminal (finger) side (distal portion) from the wrist will be referred to as a hand portion $1h$, and a portion covering an elbow side (proximal portion), that is, the forearm, will be referred to as a forearm portion $1a$ (see FIG. 3A). The mounting body 1 includes cylindrical portions (annular members) $1r_1$ and $1r_2$ to be engaged respectively with the metacarpophalangeal joints of the index finger and thumb in the hand portion $1h$, and a belt-shaped portion (intermediate annular member) $1b_2$ wound around the wrist or the vicinity thereof and a belt-shaped portion (annular member) $1b_1$ wound around the forearm in the forearm portion $1a$. When mounting body 1 is removed from the arm and spread on a plane, the hand portion $1h$ is a substantially parallelogram, and the forearm portion $1a$ is a right-angled trapezoid (a trapezoid whose one leg is perpendicular to upper and lower bases) as illustrated in FIG. 3A. In the forearm portion $1a$, the belt-shaped portions $1b$ and $1b_2$ protrude from hypotenuses (legs non-perpendicular to the lower and upper bases) along the lower and upper bases, respectively. In the hand portion $1h$, the cylindrical portion $1r_1$ and the cylindrical portion $1r_2$ are formed at a vertex tip of an acute angle opposite to the forearm portion $1a$ and a tip of an adjacent vertex, respectively. Incidentally, FIG. 3A is a wrist-elbow direction (arm axis direction) of the forearm when the reading device 10 is mounted. In addition, a direction orthogonal to the arm axis direction will be referred to as an arm-circumferential direction.

The mounting body 1 has flexibility so as not to hinder the motion of the user's arm and is formed of a sheet-like member such as cloth, synthetic leather, and rubber used for general clothing. A material having durability, breathability, waterproofness, and the like is selected according to an application of the reading device 10. In addition, the mounting body 1 may use different materials between the front side (side exposed when being worn) and the back side, and may also splice different materials for each portion such as the belt-shaped portions $1b_1$ and $1b_2$. Here, the mounting body 1 has a two-layer structure in which two sheet-like members 11 and 12 having a planar view shape illustrated in FIG. 3A are overlapped and stitched at an edge, and the two sheet-like members 11 and 12 are stitched partially in a portion other than the edge as necessary or bonded together with an adhesive. As illustrated in FIGS. 3B and 3C, cutes configured to pass the wirings 72 and 73 are formed at arrangement locations of the scanner 2 and the display panel 3 in the sheet-like member (surface material) 11 on the front side. In addition, the mounting body 1 has a cut formed on one of the sheet-like members 11 and 12 such that a hole (not illustrated) configured to pass a wiring 51 connected to the battery 5 and a charging connector $5c$ is formed in the vicinity of an arrangement location of the battery 5, or a part of the edge on the hypotenuse side is not stitched. This is because the charging connector $5c$ is taken out of the mounting body 1 when the battery 5 accommodated in the mounting body 1 is charged. In addition, in order to connect each of the belt-shaped portions $1b_1$ and $1b_2$ in an annular shape, the mounting body 1, a hook-and-loop fastener (hook) 13 is sewn to the back side of each distal end of the belt-shaped portions $1b_1$ and $1b2$, and the hook-and-loop fastener 13 and a detachable hook-and-loop fastener (loop) 14 are sewn to the front side of a portion overlapped with the belt-shaped portions $1b_1$ and $1b_2$ at the time of being worn. The hook-and-loop fastener 14 is preferably provided to be long to some extent along the longitudinal direction of the belt-shaped portions $1b_1$ and $1b_2$ so as to match a thickness around the user's arm.

When the reading device 10 is worn on the user's arm, the cylindrical portion $1r_1$ and the cylindrical portion $1r_2$ of the mounting body 1 are fixed at the base of the index finger and at the base of the thumb (between the thumb and the index finger), respectively, and the belt-shaped portion $1b_2$ is wound and fixed around the wrist or the vicinity of the wrist near the elbow by about 1 to 3 cm from the wrist. In this state, it is preferable to design a dimension of the hand portion $1h$, mainly a length in the arm axis direction so as not to hinder bending and stretching of the fingers and the motion of the wrist. The mounting body 1 is formed by the sheet-like members 11 and 12 having stretchability such that, more preferably, there is no slack in the hand portion $1h$ in the state of holding a fist and stretching the wrist, and even more preferably, there is no slack in the hand portion $1h$ in the state of stretching the fingers and the wrist and the fingers and the wrist can be bent without a sense of tension. Meanwhile, it is preferable that a length of the forearm portion $1a$ in the arm axis direction be about 15 cm or smaller such that the mounting body 1 does not cover the elbow even if the user is small. In addition, it is preferable to design the length of the forearm portion $1a$ in the arm-circumferential direction to match the thickness around the user's arm such that the display panel 3 and the battery 5 face each other with the forearm sandwiched therebetween when the reading device 10 is worn as will be described later. In addition, a part of the forearm portion $1a$ in the arm-circumferential direction or at least a part of each of the belt-shaped portions $1b_1$ and $1b_2$ preferably has stretchability, and preferably, further elasticity in order not to compress the forearm in a state where the forearm portion $1a$ is worn on the forearm with the belt-shaped portion $1b_1$ and $1b_2$ wound. Therefore, it is preferable that the length of the hand portion $1h$ in the arm axis direction and the length of the forearm portion $1a$ in the arm-circumferential direction be designed in two or three sizes different in stages so as to be selected according to the physique and mainly the length of the hand by the user although the mounting body 1 depends on the stretchability.

(Scanner)

The scanner 2 captures an image including a barcode and outputs the captured image as an electrical signal. As illustrated in FIG. 5, the scanner 2 includes a light receiving element 21, an amplifier 22, a digital converter 23, an optical system 24 such as a lens and a mirror, and a light source 25, and these are accommodated in a substantially rectangular parallelepiped housing having a transparent window on one surface. These components of the scanner 2 are components of a camera module of a general code reader such as a barcode reader and a 2D code reader, and a charge coupled device (CCD) image sensor, a complementary metal-oxide semiconductor (CMOS) image sensor, or the like can be applied in accordance with a type of a symbol (a barcode, a two-dimensional (2D) code, or the like, or two or more types of symbol among these) that can be read by the reading device 10. The light source 25 is a light source such as a light emitting diode (LED) or a laser diode (LD) that irradiates a subject with spot light, and is provided depending on a scheme of the image sensor as necessary. The light receiving element 21 is a photodiode, and receives diffused reflection light from the subject via the optical system 24 and converts the received light into an electric charge. The amplifier 22 and the digital converter 23 are configured using operational amplifiers or the like, amplify an analog electric signal output from the light receiving element 21, binarize the signal, and output a digital electric signal. The scanner 2 has the surface having the window as a front surface and captures an image of the subject facing the front surface. The scanner 2 preferably has an autofocus (AF) function. Therefore, the scanner 2 includes an actuator that moves the optical system 24 and the light source 25, or the optical system 24 is provided with a liquid lens whose focal length is moved by voltage application. The scanner 2 preferably is small and lightweight so as not to hinder user's work while having a necessary function.

As illustrated in FIGS. 3A and 3C, the scanner 2 is bonded to the front side of the mounting body 1 with an adhesive or the like, and is fixed to the vicinity of the cylindrical portion $1r_1$ in the hand portion $1h$ of the mounting body 1 such that the front surface faces the cylindrical portion $1r_1$, in other words, the front surface faces the opposite side of the side where the display panel 3 is arranged. That is, the scanner 2 is fixed such that one direction from the display panel 3 toward the scanner 2 is a reading direction. With such an arrangement, the scanner 2 is arranged in the vicinity of a third joint of the index finger on the back of the hand and captures an image of the subject located on the finger side with respect to the hand when the reading device 10 is worn as illustrated in FIG. 1. Incidentally, when being long in the width direction, the scanner 2 is preferably arranged to be close to a middle finger in the hand portion $1h$ so as not to protrude into a gap between the index finger and the thumb (interspace between the fingers) when viewed from the back of the hand. The scanner 2 can irradiate the other side (front side) of the hand with the spot light in a state where the user holds the fist, and does not hinder the user's work when the scanner 2 is not operating. In addition, the scanner 2 is connected to the electronic circuit board 4 via the wiring 72 to supply power, output a digital electric signal, and the like. Since the wiring 72 is accommodated between the sheet-like members 11 and 12 of the mounting body 1, the scanner 2 is connected to the wiring 72 at a bonding surface (lower surface) with the mounting body 1 or a lower portion of a back surface.

(Trigger Button)

The trigger button $2s$ is an input operation section configured to cause the scanner 2 to start reading image information. As illustrated in FIGS. 3A, 4, and 5, the trigger button $2s$ is connected to the electronic circuit board 4 via the wiring 74, and a signal generated by operating the trigger button $2s$ is input to the control unit 41 of the electronic circuit board 4. It is preferable that the trigger button $2s$ be operable only with one hand (left hand) on the side where the reading device 10 is worn, and hardly cause a shake when operated. Therefore, the trigger button $2s$ is preferably a push button switch, and is fixed to the vicinity of a terminal of the cylindrical portion $1r_1$ of the mounting body 1 on the side facing the cylindrical portion $1r_2$ to be arranged on the side surface facing the thumb in the vicinity of the second joint in the metacarpophalangeal joint of the index finger. In addition, the trigger button $2s$ is the push button switch, and thus, is accommodated between the sheet-like members 11 and 12, and is attached and fixed to one inner surface. With such an arrangement, the trigger button $2s$ can be easily pressed by the user with a tip of the thumb of the left hand (see FIG. 6). Incidentally, a mark may be attached to a front surface (outer surface) of the sheet-like member (outer material) 11 on the trigger button $2s$ (not illustrated) in order to make a position of the trigger button $2s$ easy to understand.

(Display Panel)

The display panel 3 is a display section configured to visually indicate information (an article type, a model number, a serial number, history, and the like) of an article with image information read by scanner 2 and information such as a work instruction content received from the outside, such as the host computer, to the user. The display panel 3 may also indicate a current state of the scanner 2 (a state in the middle of imaging, a state in the middle of decoding, whether the operation of the trigger button is valid or invalid, or the like). The display panel 3 may display these pieces of information in a predetermined format, and may display a current time and the like simultaneously. Incidentally, it is preferable that a character and the like displayed on the display panel 3 be a size that is readable in the state of being separated by about 0.3 to 0.5 m. The display panel 3 has, for example, a flat-plate-shaped housing with a rounded rectangular shape in a plan view, is preferably lightweight and thin, and is preferably power-saving. Specifically, the display panel 3 is a liquid crystal panel or an organic electro-luminescence (EL) panel. The display panel 3 may be either color display or monochrome display, which is selected according to an application of the reading device 10. Although a screen size of the display panel 3 depends on the application of the reading device 10, the size is preferably 2 inches or larger, and it is possible to simultaneously display more information, such as the number of characters, as the size increases. On the other hand, when the display panel 3 is increased in size, and particularly, a length of a short side is long, it becomes difficult to fix the display panel 3 at a predetermined position of the forearm. In addition, if a length of a long side is long and the display panel 3 is arranged up to a portion of the forearm close to the elbow, it is difficult for this portion of the display screen to enter the field of view, and the burden on the user increases due to an increase in weight. Therefore, the screen size of the display panel 3 is preferably 3.5 inches or smaller. It is preferable that the display panel 3 perform display with the longitudinal direction as the horizontal direction, be capable of rotating the screen display in a desired direction by an input operation, or have an automatic rotation function of screen display by incorporating an acceleration sensor or a gyro sensor.

As illustrated in FIGS. 3A and 3B, the display panel 3 is bonded to the front side of the mounting body 1, and is connected to the wiring 73 at the bonding surface (lower surface) with the mounting body 1 in order to supply power from the electronic circuit board 4 or input the electric signal similarly to the scanner 2. The display panel 3 is fixed to the forearm portion $1a$ on an extension on the scanner 2 side from the cylindrical portion $1r_1$ of the mounting body 1 with the extension direction (arm axis direction) as the longitudinal direction. That is, the display panel 3 is fixed such that one direction from the display panel 3 toward the scanner 2 is the longitudinal direction. With this arrangement, the display panel 3 is arranged along the arm axis direction on the side surface of the forearm close to the thumb, that is, on a radius, when the reading device 10 is worn as illustrated in FIG. 1. As a result, the entire display screen on the upper surface of the display panel 3 naturally enters the user's field of view if the arm on which the reading device 10 is worn is in a posture on the front side of user's torso or head as will be described later. The display panel 3 is fixed to the mounting body 1 such that at least a part of the display screen is arranged on the radius in the forearm. Preferably, the center of the display panel 3 in the arm-circumferential direction of the display screen is arranged immediately above the radius or slightly outside (on the back of the hand) of the radius from the index finger to the extension in the arm axis direction such that the display screen is perpendicular to the line of sight with a posture in which the user lifts the elbow to the front side of the chest. In addition, the display panel 3 is fixed to the forearm and the vicinity of the wrist by the belt-shaped portions $1b_1$ and $1b_2$ of the mounting body 1 in the vicinity of both outer sides in the longitudinal direction, and the mounting body 1 is fixed at the bases of the index finger and thumb by the cylindrical portions $1r_1$ and $1r_2$, and thus, the display panel 3 is stably fixed to the forearm both in the arm axis direction and the arm-circumferential direction even if the user moves. The display panel 3 is arranged to the mounting body 1 such that the longitudinal direction, that is, the arm axis direction when the reading device 10 is worn becomes the horizontal direction of the display screen and display is performed to cause the thumb side to face downward. Alternatively, the display panel 3 may perform display such that the arm axis direction becomes the vertical direction of the display screen and the elbow side faces downward.

(Electronic Circuit Board)

As illustrated in FIG. 5, the electronic circuit board 4 includes the control unit 41, a decoding processing unit 42, a storage unit 43, and a communication unit 44. In addition, the electronic circuit board 4 is connected to the battery 5 through the wiring 71 and supplied with power, and also passes the power to the scanner 2 and the display panel 3. The control unit 41 is a control section configured to control other components such as the decoding processing unit 42 in the electronic circuit board 4 and operations of the scanner 2, the display panel 3, and the like. The decoding processing unit 42 is a decoder of a barcode or a two-dimensional code, and decodes the digital electrical signal output from the digital converter 23 of the scanner 2 into article information. The storage unit 43 stores the article information and the information received by the communication unit 44, and the like. The communication unit 44 communicates with the host computer or the like via a wireless local area network (LAN) or the like. The electronic circuit board 4 includes a central processing unit (CPU), a read only memory (ROM), a random access memory (RAM), a wireless LAN antenna of the communication unit 44, and the like, and is built in a thin housing having a rectangular shape in a plan view in order to protect these electronic components from an external impact. As illustrated in FIGS. 3A and 3B, the electronic circuit board 4 is accommodated between the sheet-like members 11 and 12 of the mounting body 1, and is arranged next to the display panel 3 in the forearm portion $1a$ with the longitudinal direction of the housing as the arm axis direction. That is, the electronic circuit board 4 is arranged so as to be aligned with the display panel 3 in a direction perpendicular to one direction from the display panel 3 toward the scanner 2. In addition, the electronic circuit board 4 is arranged so as to be sandwiched between the battery 5 and the display panel 3. It is preferable that a length of a short side, which is a length in the arm-circumferential direction, of the housing of the electronic circuit board 4 be short in a range in which a length in the longitudinal direction is within the forearm portion $1a$ of the mounting body 1. For example, the electronic circuit board 4 is bonded and fixed to the inner surface of the sheet-like member 11 or the sheet-like member 12 with an adhesive or the like. Alternatively, the electronic circuit board 4 may be arranged to be movable to some extent by stitching the sheet-like member 11 and the sheet-like member 12 along the periphery thereof in a plan view while avoiding a portion where the wirings 71, 72, and 73 pass. In particular, when the mounting body 1 has stretchability, the stretching of the mounting body 1 is not hindered with such a configuration.

(Battery)

The battery 5 is a power supply for the scanner 2, the display panel 3, and the electronic circuit board 4, and it is possible to use a general battery mounted on a mobile device, for example, a lithium ion battery, having a voltage to drive these components. The battery 5 is preferably suppressed in heat generation, and is preferably lightweight and thin. As illustrated in FIGS. 3A and 3B, the battery 5 is accommodated between the sheet-like members 11 and 12 of the mounting body 1 similarly to the electronic circuit board 4, and is arranged next to the electronic circuit board 4 in the forearm portion $1a$ with the longitudinal direction of a rectangular in a plan view as the arm axis direction. That is, the electronic circuit board 4 is arranged so as to be aligned with the display panel 3 in a direction perpendicular to one direction from the display panel 3 toward the scanner 2. In addition, the battery 5 is provided with the charging connector $5c$ connected via the wiring 51. The battery 5 is preferably arranged on a side surface (on an ulna) of the forearm close to a little finger so as to face the display panel 3 with the forearm sandwiched therebetween when the reading device 10 is worn. With such a configuration, the battery 5 is arranged in the reading device 10 so as to be shifted in the arm-circumferential direction with respect to the relatively heavy display panel 3, and thus, the display panel 3 is stably fixed to a predetermined portion of the forearm, and the load on the user is reduced.

(Finger Portion Input Key)

The finger portion input key 61 is an input operation section configured to cause a predetermined operation by user's operation, is connected to the electronic circuit board 4 via the wiring 75, and a signal generated by operating the finger portion input key 61 is input to the control unit 41 of the electronic circuit board 4. Here, the finger portion input key 61 starts and stops the supply of power from the battery 5 to the electronic circuit board 4 as a main power switch. It is preferable that the finger portion input key 61 be operable only with one hand (left hand) on the side where the reading device 10 is worn, and hardly cause an erroneous operation, which is similar to the trigger button 2s. Thus, the finger portion input key 61 is a push button switch that is continuously pressed for a predetermined time (for example, two seconds), that is, reacts with a long press, is fixed to the vicinity of a distal end of the cylindrical portion $1r_2$ of the mounting body 1 to be arranged near the terminal of the back of the metacarpophalangeal joint of the thumb (the first joint), and is accommodated between the sheet-like members 11 and 12 similarly to the trigger button 2s. With this arrangement, the finger portion input key 61 is pressed when the user folds the thumb of the left hand toward the palm side and places a fingertip of the index finger or the middle finger on the folded thumb. Therefore, the finger portion input key 61 can be operated only with the left hand, is not easily pressed unintentionally, and does not react when being pressed for a short time (instantaneously), such that an erroneous operation is unlikely to occur.

(Input Key)

The input key 62 is an input operation section configured to cause a predetermined operation by user's operation, and is operated with a hand (right hand) opposite to the side on which the reading device 10 is worn. Here, the input key 62 is provided beside the display screen on the upper surface of the display panel 3 and is represented by a circular push button, but may be a cross key or a jog dial, and a plurality of the input keys 62 may be provided as necessary and provided on a side surface of the display panel 3. The input key 62 is connected to the electronic circuit board 4 via the display panel 3 and the wiring 73, and a signal generated by operating the input key 62 is input to the control unit 41 of the electronic circuit board 4. The input key 62 performs, for example, display switching and setting change of the display panel 3.

(Wiring)

As illustrated in FIGS. 3A and 4, the wiring 71 is a pair of two conductive wires connecting the battery 5 and the electronic circuit board 4, and constitutes a path to supply power from the battery 5. The wirings 72, 73, 74, and 75 are wirings that connect the electronic circuit board 4 to the scanner 2, the display panel 3, the trigger button 2s, and the finger portion input key 61, respectively, and constitute a path for the power supply from the battery 5 and an operation command signal from the control unit 41 of the electronic circuit board 4. The wirings 71, 72, 73, 74, and 75 are configured using insulated electric wires such as vinyl-coated copper wires of the required number in accordance with the number of electrical signals, and the wiring having a large number of wires is formed using a flat cable that is bundled in a belt shape and fused together, or a flexible printed circuit (FPC) cable. The wiring 74 connected to the trigger button 2s is branched from the wiring 72 connected to the scanner 2 arranged in the vicinity of the trigger button 2s. These wirings 71, 72, 73, 74, and 75 are accommodated between the sheet-like members 11 and 12 of the mounting body 1 to be protected from an external impact and not to hinder the user's work. In addition, the wirings 71, 72, 73, 74, and 75 have flexibility so as to follow deformation and stretching or contraction when the mounting body 1 is deformed and stretched or contracted by the user's operation or the like when the reading device 10 is worn, has a length in accordance with the time when the mounting body 1 is stretched, is not fixed except for a connection terminal with the electronic circuit board 4 or the like, and is accommodated movably between the sheet-like members 11 and 12. Alternatively, the wirings 71, 72, 73, 74, and 75 may be accommodated so as to limit a movement range, and it is preferable to limit the movement range in order to prevent disconnection particularly for the wirings 72 and 74 and the wiring 75 each of which has a long wiring length and is arranged across the wrist and a finger joint. Thus, the wiring 72 and the like may be fixed by, for example, being locally sewed to the sheet-like member 11 or the sheet-like member 12 or may be accommodated so as not to move outward by stitching the sheet-like member 11 and the sheet-like member 12 to each other at two locations sandwiching the wiring 72 and the like in a plan view.

(Operation of Reading Device)

Figure 6:
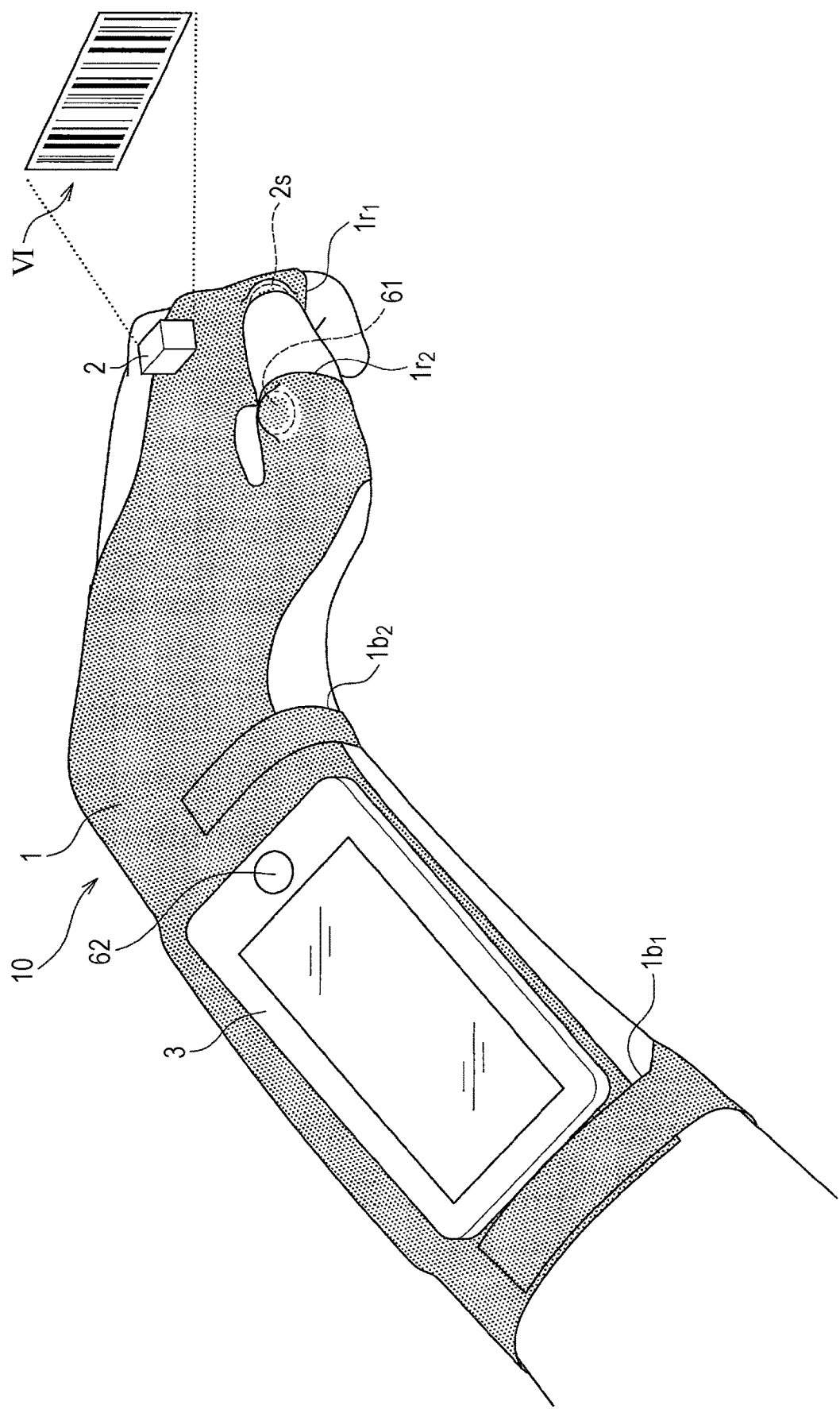
FIG. 6 is an external view from user's viewpoint for describing a state when the wearable electronic device according to the embodiment of the present invention is used.
Figure 7A:
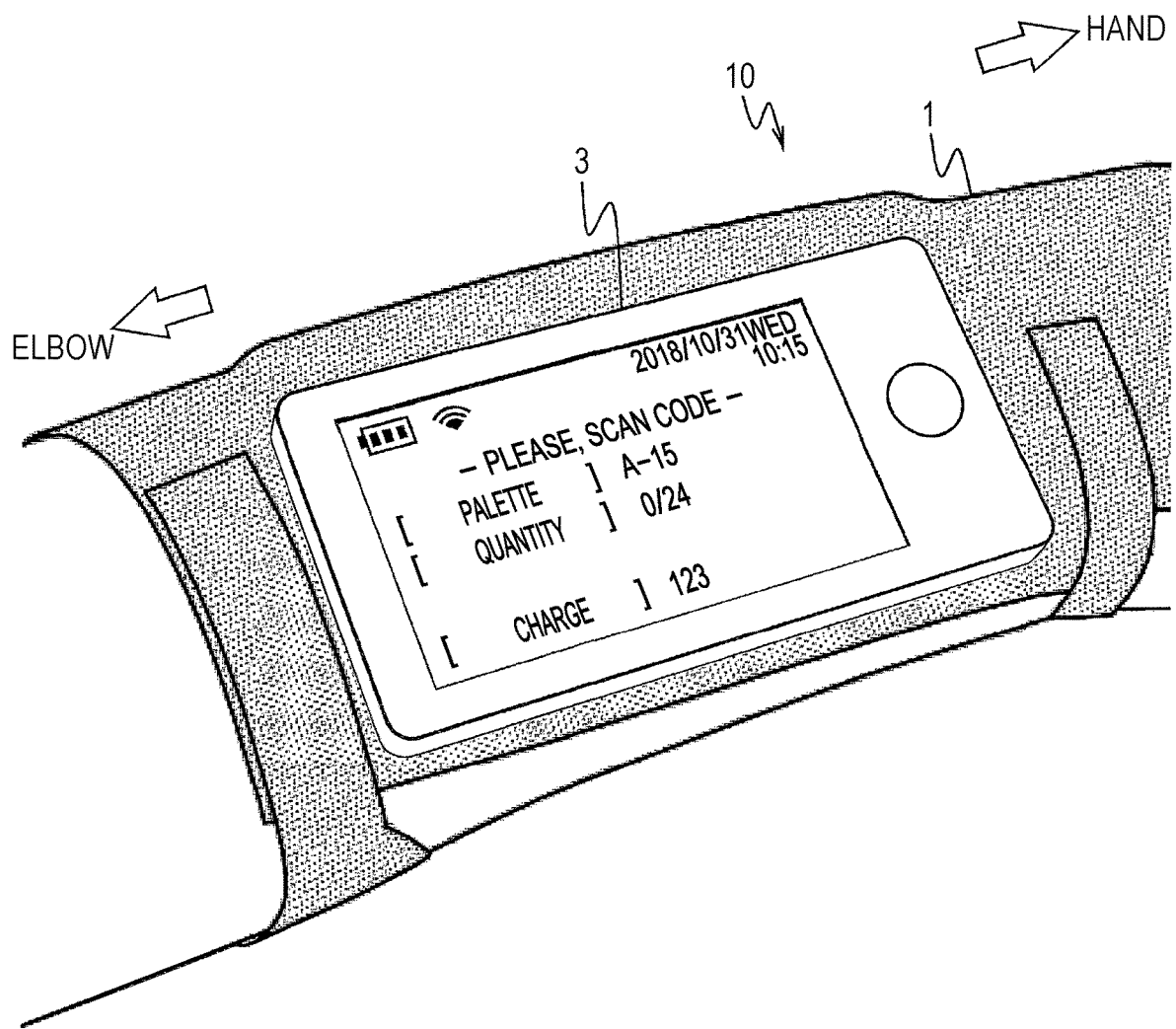
FIG. 7A is an external view of a portion of a display section from the user's viewpoint when the wearable electronic device according to the embodiment of the present invention is used.
Figure 7B:
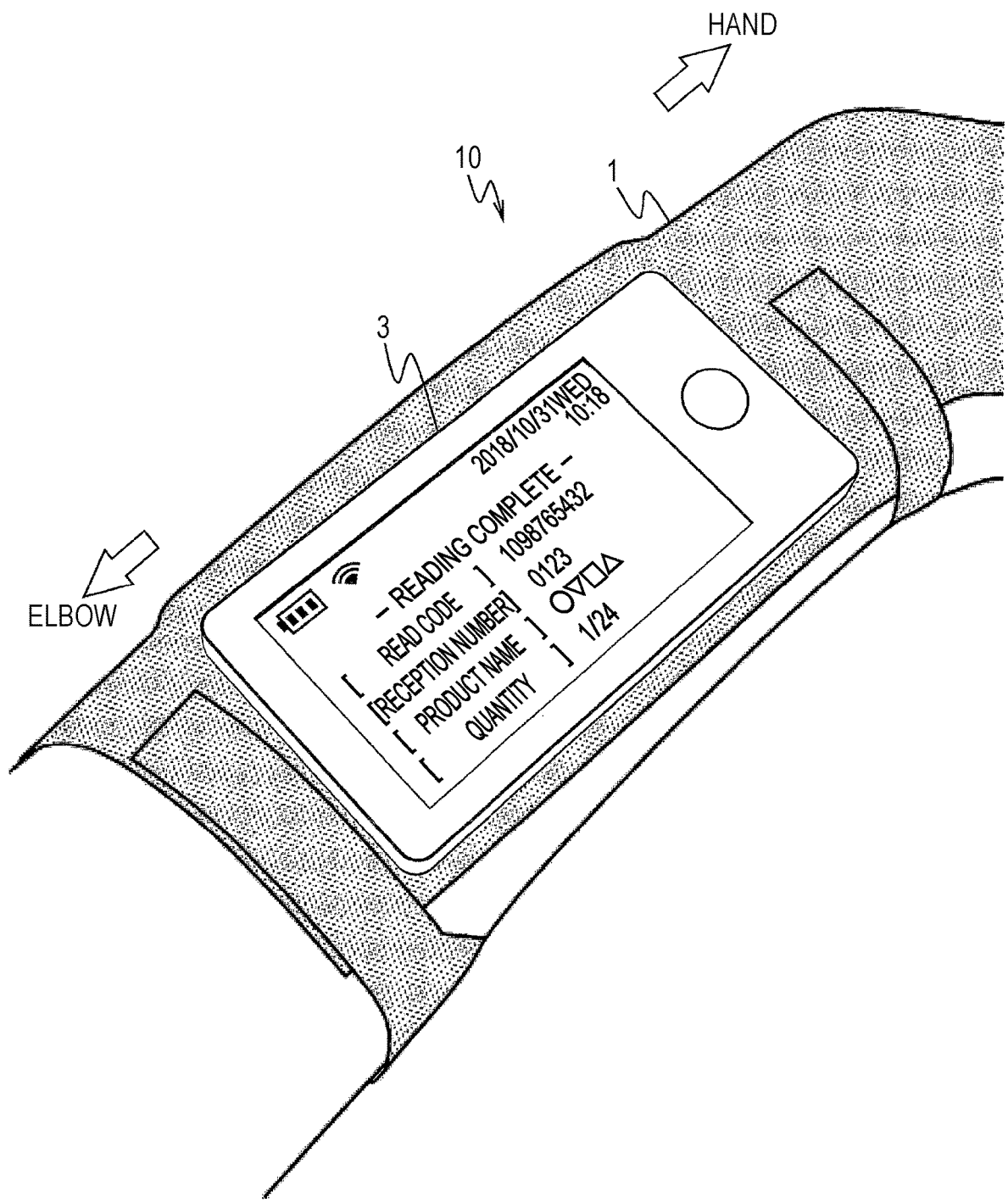
FIG. 7B is an external view of the portion of the display section from the user's viewpoint when the wearable electronic device according to the embodiment of the present invention is used, and is a partially enlarged view of FIG. 6.

An operation of the reading device 10 will be described with reference to FIGS. 6, 7A, 7B, and 5. FIG. 6 is an external view from user's viewpoint for describing a state when the wearable electronic device according to the embodiment of the present invention is used. FIGS. 7A and 7B are external views of a portion of the display section from the user's viewpoint when the wearable electronic device according to the embodiment of the present invention is used, and FIG. 7B is a partially enlarged view of FIG. 6.

First, when the finger portion input key 61 is pressed for a long time, the reading device 10 is activated. Then, the display panel 3 displays a date and current time, a remaining battery level of the battery 5, a communication state of a wireless LAN, and a state of the scanner 2, for example, imaging once every time the trigger button 2s is pressed (a trigger mode). When the host computer transmits a work instruction or the like to the reading device 10, the communication unit 44 receives the work instruction or the like and displays the content thereof on the display panel 3 as illustrated in FIG. 7A. When the trigger button 2s is pressed in a state where the operation of the trigger button 2s of the scanner 2 is valid, a signal generated by the operation of the trigger button 2s is input to the control unit 41 of the electronic circuit board 4. Then, power is supplied from the battery 5 to the scanner 2 by the control unit 41, and the light source 25 is turned on. In addition, the display panel 3 displays that the scanner 2 is in the middle of imaging (scanning). When the light receiving element 21 receives light and there is an image VI having a specific element, such as a barcode, in an irradiation region of spot light emitted from the scanner 2 (the light source 25) as illustrated in FIG. 6, an electrical signal is output, and then, the light source 25 is turned off. The decoding processing unit 42 decodes the electrical signal input from the scanner 2 and outputs the decoded article information to the control unit 41. The control unit 41 displays the article information on the display panel 3 in a predetermined format as illustrated in FIG. 7B, stores the article information in the storage unit 43, and transmits the article information to the host computer by the communication unit 44. When there is no barcode or the like in the irradiation region of the spot light for a certain period of time after the light source 25 starts lighting, the light source 25 is turned off, an imaging error is displayed on the display panel 3, and a state before pressing the trigger button 2s is restored. In addition, the reading device 10 may have a configuration in which the scanner 2 can perform imaging only while the trigger button 2s is pressed or a configuration in which constant imaging (continuous reading mode) is possible regardless of the operation of the trigger button 2s, and may have a configuration in which the above configurations can be selected by mode switching with the operation of the input key 62 or the like. In the continuous reading mode, the operation of the trigger button 2s is invalid, the scanner 2 is automatically turned into the state of being capable of performing imaging again each time the barcode or the like imaged by the scanner 2 is decoded and the information thereof is stored or transmitted. When the reading device 10 is not operated for a certain period of time and there is no reception from the host computer, the reading device 10 enters a standby state and the display on the display panel 3 disappears. The reading device 10 is released from the standby state with the operation of the trigger button 2s, the input key 62, or the like, or reception from the host computer.

As described above, the instruction from the host computer, the article information read by the scanner 2, and the like are displayed on the display panel 3 in a series of operations of the reading device 10. According to the reading device 10, the display panel 3 is fixed to the side surface of the user's forearm close to the thumb. If the left forearm is in front of the user's torso or head, in other words, unless the left arm on which the reading device 10 is worn is completely lowered, conversely raised high above the head, or turned to the back side, the entire display screen on the upper surface of the display panel 3 enters the field of view and does not tilt significantly with respect to the line of sight. Since the display panel 3 has a sufficiently large display screen, it is easy to perform reading even if the number of characters to be displayed simultaneously is increased and the display screen is tilted to some extent with respect to the user's line of sight. Therefore, the user can view the content displayed on the display panel 3 during work immediately and easily without consciously changing a posture. In particular, as illustrated in FIGS. 6 and 7B, the display screen of the display panel 3 enters the field of view with a posture where the elbow is lightly bent and the first is pushed forward such that the front surface of the scanner 2 faces the image VI in front of the user, and the displayed content can be read only by moving the line of sight slightly with the face facing the image VI.

(Modification)

The reading device 10 can be also configured such that the decoding processing unit 42 has an optical character recognition (OCR) function to read a character, and can be also configured to be capable of reading both the character and a symbol such as a two-dimensional code. In addition, the reading device 10 can be also configured such that image data imaged by the scanner 2 serving as a normal camera is stored as it is or transmitted to the host computer.

The reading device 10 may be fixed to the front side of the cylindrical portion 1$r_1$ of the mounting body 1 such that the scanner 2 is arranged on the back of the metacarpophalangeal joint of the index finger. Such a scanner 2 preferably has a width equal to or shorter than a width of the metacarpophalangeal joint of the index finger. In this case, the trigger button 2s may be provided on the side surface of the housing of the scanner 2 close to the thumb. In the reading device 10, the decoding processing unit 42 may be provided separately from the electronic circuit board 4. Specifically, the small electronic circuit board equipped with the decoding processing unit 42 is accommodated between the sheet-like members 11 and 12 in the hand portion 1h of the mounting body 1, is connected to the scanner 2 with the short wiring 72, and is connected to the electronic circuit board 4 additionally with a flat cable or the like. Furthermore, the electronic circuit board for the scanner may be equipped with a module and an antenna that performs short-range wireless communication such as Bluetooth (registered trademark) and connect the trigger button 2s and the finger portion input key 61 by the wirings 74 and 75. The module of the same standard as the short-range wireless communication is equipped on the communication unit 44 of the electronic circuit board 4 to perform transmission and reception of an electrical signal with the scanner 2, the decoding processing unit 42, the trigger button 2s, the finger portion input key 61, and the control unit 41 in a wireless manner. In this case, the wiring connecting the electronic circuit board for the scanner and the electronic circuit board 4 is a pair of two conducting wires for supply of power, such as the wiring 71. Furthermore, a small battery having a small battery capacity may be accommodated between the sheet-like members 11 and 12 in the hand portion 1h together with the electronic circuit board for the scanner as a power supply for the scanner 2 and the electronic circuit board for the scanner. With such a configuration, a long wiring extending from the forearm portion 1a to the hand portion 1h of the mounting body 1 is few or unnecessary in the reading device 10, and a failure caused by disconnection hardly occurs.

The electronic circuit board 4 may be built in the display panel 3 in the reading device 10. Alternatively, the battery 5 may be built in the display panel 3 or the electronic circuit board 4 in the reading device 10. Furthermore, the electronic circuit board 4 and the battery 5 may be built in the display panel 3 in the reading device 10. With such a configuration, the wiring accommodated between the sheet-like members 11 and 12 in the forearm portion 1a of the mounting body 1 is reduced in the reading device 10, and the failure caused by disconnection hardly occurs. In these configurations, it is preferable that the display panel 3 do not increase in weight, for example, have a relatively small screen size even if the electronic circuit board 4 or the like is incorporated.

The reading device 10 may include an LED of red, green, or the like as a display section in addition to liquid crystal and organic EL to be turned on or off, and the LED is mounted to the surface of the housing of the display panel 3 and the scanner 2 or bonded to the front side of the mounting body 1. Particularly, the LED is mounted to an end on the wrist side in an upper surface of the display panel 3, to a portion next to the wrist side of the display panel 3 on the mounting body 1, or the like that easily enters the user's field of view, which is suitable for notification of reception from the host computer. In addition, the LED equipped on the housing of the scanner 2 enters the field of view while the user looks at the image VI, which is suitable for displaying the state of the scanner 2 (that is, the state in the middle of imaging, the imaging error, and the like).

In the reading device 10, the display panel 3 may have a touch panel function on the display screen as the input key 62. In the reading device 10, the display screen of the display panel 3 is horizontal or slightly tilted forward with a natural posture of the user, and thus, it is easy to perform the input with the right hand. Alternatively, the reading device 10 may be provided with the input key 62 other than the display panel 3. For example, the input key 62 can be provided as a push button on the upper surface of the housing of the electronic circuit board 4 to be operated by being pressed from above the sheet-like member 11 of the mounting body 1. The reading device 10 may be configured to activate the reading device 10 by the operation with the right hand using the input key 62 as a main power switch. In this case, the reading device 10 can be configured not to include the finger portion input key 61 and the wiring 75. The finger portion input key 61 may be, for example, a lock release key for the trigger button 2s. Alternatively, a configuration in which the lock is released by pressing the trigger button 2s for a long time may be adopted. In addition, the reading device 10 may be configured to start reading by operating the input key 62 with the right hand, instead of the trigger button 2s, without providing the trigger button 2s and the wiring 74 or may be configured to read a barcode or the like in the continuous reading mode. In addition, the trigger button 2s and the finger portion input key 61 may be bonded and fixed to the front side of the mounting body 1 similarly to the scanner 2, and for this purpose, cuts for passing the wirings 74 and 75 are formed in the sheet-like member (outer material) 11. In addition, it is also possible to scroll the screen of the display panel 3, for example, by using the finger portion input key 61 as a jog dial and tracing the back of the thumb with the index finger. The reading device 10 can also be configured to be activated by winding the belt-shaped portion $1b_2$ of the mounting body 1 to be fixed to the arm. For example, switches are provided on the hook-and-loop fasteners 13 and 14, and electricity is supplied when the hook-and-loop fastener 13 and the hook-and-loop fastener 14 come into contact with each other.

The reading device 10 may include a notification section using a voice, such as a speaker, or a notification section using an actuator, such as a vibrator. In addition, the reading device 10 may include an input section using a voice, such as a microphone. Similarly to the display panel 3, the speaker and the microphone are preferably provided on the front side of the mounting body 1 close to the thumb in the forearm, and thus, may be built in the display panel 3. The vibrator may be built in the display panel 3 or may be accommodated between the sheet-like members 11 and 12 of the mounting body 1 such that the user can easily sense vibration, and is preferably arranged in a region where the hook-and-loop fastener 14 wound by the belt-shaped portion $1b_2$ of the forearm portion $1a$ is sewn, the region relatively in close contact with the arm.

As described above, it is preferable that the mounting body 1 be soft and stretchable and have a high stretchability to some extent in the hand portion $1h$ such that the motion of finger or the wrist is not hindered and the scanner 2 is fixed on the back of the hand. On the other hand, in the forearm portion $1a$, it is preferable that the stretchability be not too high in order to fix the relatively heavy display panel 3 and the like including the belt-shaped portions $1b_1$ and $1b_2$ to the forearm. Therefore, the mounting body 1 may be formed by applying materials, different in stretchability between the hand portion $1h$ and the forearm portion $1a$, to the sheet-like members 11 and 12 to be darned together. In this case, for example, only the sheet-like member (outer material) 11 can be darned, and the sheet-like member (lining) 12 can be integrally formed using a highly stretchable material. As described above, when the stretchability of the forearm portion $1a$ is low, it is preferable that the belt-shaped portions $1b_1$ and $1b_2$ have stretchability. Alternatively, in the mounting body 1, a material having high stretchability may be applied to the sheet-like members 11 and 12, and a core material having low stretchability may be sandwiched between the sheet-like members 11 and 12 in some regions. Specifically, the regions include a region where the display panel 3 is fixed and a region obtained by extending this region to both ends of the forearm portion $1a$ in the arm axis direction. At this time, it is preferable to attach a core material to the sheet-like member (outer material) 11 such that the display panel 3 is fixed to the core material or to form a large cut for passing the wiring 73 of the sheet-like member (outer material) 11 and directly attach the display panel 3 to the core material. In this manner, the mounting body 1 is formed to have the low stretchability partially in the region where the display panel 3 is fixed and the vicinity thereof, and thus, the display panel 3 is stably fixed to the forearm by the belt-shaped portions $1b_1$ and $1b_2$. The mounting body 1 may also be provided with a core material in the same manner for a region where the battery 5 and the electronic circuit board 4 are accommodated. In this case, the core material may be arranged on either the front side or the back side of the battery 5 or the like, and it is preferable that the battery 5 or the like and the core material are attached and fixed.

The mounting body 1 may include a cushion material, such as a urethane sheet, in a region on an inner surface of the sheet-like member (lining) 12 (between the sheet-like members 11 and 12) to which the display panel 3, the electronic circuit board 4, and the like are fixed or a region below the wirings 72 and 74 and the wiring 75 in the region wound by the belt-shaped portion $1b_2$. With such a configuration, the display panel 3 and the like are more stably fixed to the forearm, and the feeling of pressure on the user's arm due to the wearing of the reading device 10 is reduced. Alternatively, the sheet-like member (lining) 12 may be formed of a cushion material. In addition, the cushion material arranged in the region where the display panel 3 and the like are fixed may be formed to have a flat surface on a front side facing the display panel 3 and a concave surface along the front surface of the arm on a back side. With such a configuration, the display panel 3 and the like are more stably fixed to the forearm, which is particularly advantageous when the display panel 3 is large.

The mounting body 1 can also be configured to be fixed to the arm other than the hook-and-loop fasteners 13 and 14. For example, a buckle is provided by being sewn on the front side of the end of the forearm portion $1a$ to which the display panel 3 is fixed, instead of the hook-and-loop fastener 14, and belt holes are formed in the belt-shaped portions $1b_1$ and $1b_2$. In addition, the belt-shaped portions $1b_1$ and $1b_2$ may be partially or entirely formed of an elastic member, such as a flat rubber, in the mounting body 1. In this case, the ends of the belt-shaped portions $1b_1$ and $1b_2$ can be sewn to the end of the forearm portion $1a$ to be fixed in an annular shape. In addition, the mounting body 1 may have a continuous shape between the belt-shaped portions $1b$ and $1b_2$. It is sufficient for the mounting body 1 to be fixed in at least portions corresponding to the belt-shaped portions $1b_1$ and $1b_2$, that is, the end on the elbow side and the vicinity of the wrist. Therefore, the mounting body 1 may be provided with a fastener along the arm axis direction for attachment and detachment as an arm cover shape covering the entire arm-circumferential direction of the forearm. In addition, the cylindrical portions $1r_1$ and $1r_2$ can also be configured to be connected in an annular shape with a fastener such as a snap and a hook-and-loop fastener. In this case, the hand portion $1h$ can be easily removed from the finger and the back of the hand with the reading device 10 fixed to the forearm in the forearm portion 1a of the mounting body 1, and the scanner 2 can be temporarily removed from the back of the hand, for example, when taking a break or performing detailed work with the fingertip. A portion from the wrist of the reading device 10 can be folded back and fixed by attaching a fastener connected to the fastener of the cylindrical portion $1r_1$ to the front side of the mounting body 1 on the electronic circuit board 4.

The mounting body 1 may be worn with the index finger provided open by providing the cylindrical portions $1r_1$ and $1r_2$ in the hand portion 1h so as to pass through the metacarpophalangeal joints of the middle finger and the thumb, respectively. Alternatively, the cylindrical portions $1r_1$ and $1r_2$ may be provided in the hand portion 1h in the mounting body 1 so as to pass through the respective metacarpophalangeal joints of the middle finger and the index finger. In this case, the finger portion input key 61 is provided so as to be arranged on a side surface, which faces the thumb, of the metacarpophalangeal joint of the index finger covered by the cylindrical portion $1r_2$. In addition, the mounting body 1, particularly the hand portion 1h, can be formed as the structure with high stretchability such that the user can wear the mounting body 1 by selecting the index finger and thumb or the middle finger and thumb to pass through the cylindrical portions $1r_1$ and $1r_2$. The mounting body 1 may have a length that allows the cylindrical portions $1r_1$ and $1r_2$ to cover the proximal and distal interphalangeal joints of the fingers, or may have a bag shape that covers the fingertips. The mounting body 1 may be fixed with the index finger or the fingertip of the thumb by the cylindrical portions $1r_1$ and $1r_2$ formed in a bag shape. In addition, the trigger button 2s may be fixed to the cylindrical portion $1r_1$ so as to be arranged at the proximal interphalangeal joint of the index finger or the finger portion input key 61 may be fixed to the cylindrical portion $1r_2$ so as to be arranged on a thumb nail in such mounting bodies 1. In addition, the mounting body 1 may be formed to be short such that the cylindrical portion $1r_1$ engages only with the base of the index finger in the configuration in which the reading device 10 does not include the trigger button 2s as described above. In addition, the short cylindrical portion $1r_2$ may be provided or is not necessarily provided in the mounting body 1 in the configuration that does not include the finger portion input key 61. In this manner, a terminal end side of the arm is fixed to the single index finger in the configuration in which the mounting body 1 has only one cylindrical portion $1r_1$ in the hand portion 1h. According to such a configuration, the user can wear the mounting body 1 by passing the middle finger through the cylindrical portion $1r_1$ according to ease of use. On the other hand, the mounting body 1 may have a structure in which the hand portion 1h is further provided with a cylindrical portion other than the cylindrical portions $1r_1$ and $1r_2$ to cover the middle finger or the like, and may have, for example, a fingerless glove shape for five fingers. Furthermore, a cylindrical portion that covers the metacarpophalangeal joint or even the proximal interphalangeal joint of the middle finger can be provided to arrange the finger portion input key 61 on a side surface close to the thumb. In addition, the mounting body 1 may be configured to cover the palm.

The mounting body 1 may be configured so as not to be fixed to the arm in the vicinity of the wrist. Specifically, the mounting body 1 is formed to have a structure in which the belt-shaped portion $1b_2$ is gently wound to be connected in an annular shape so as not to tighten the wrist or the vicinity thereof when worn or is fixed in an annular shape with a diameter that allows a hand to pass therethrough without providing the hook-and-loop fasteners 13 and 14. Therefore, the mounting body 1 is fixed in the bases of the index finger and the thumb by the cylindrical portions $1r_1$ and $1r_2$ and in the forearm by the belt-shaped portion $1b_1$. Such a mounting body 1 preferably has appropriate stretchability and elasticity such that the display panel 3 and the like do not float from the arm in the state where the wrist is stretched. In addition, it is preferable to adopt the structure that covers the middle finger and the like in addition to the cylindrical portions $1r_1$ and $1r_2$ to be fixed to a range wider than the back of the hand. In the reading device 10 provided with such a mounting body 1, the display panel 3 is preferably lightweight with a relatively small screen size or the like. In such a reading device 10, the mounting body 1 does not tighten the circumference of the wrist, the feeling of pressure is reduced.

The mounting body 1 may be configured such that the forearm portion 1a and the hand portion 1h can be separated. For example, an overlapping margin with the forearm portion 1a is provided on the hand portion 1h, and a hook-and-loop fastener is sewn to a front side of the hand portion 1h and a back side of the forearm portion 1a. In addition, a cut for passing the wirings 72 and 74 and the wiring 75 is formed in one of the sheet-like members 11 and 12 at the end (wrist side) edge of the forearm portion 1a and the sheet-like member 11 of the hand portion 1h. When the scanner 2 has a configuration in which the wiring 72 is connected to the back surface, the wiring 72 may be connected to the scanner 2 while leaving the wiring 72 to the front side from the cut of the forearm portion 1a. With such a configuration, the hand portion 1h and the forearm portion 1a can be connected by shifting the arrangement of the cylindrical portions $1r_1$ and $1r_2$ of the hand portion 1h and the arrangement of the display panel 3 on the forearm portion 1a to some extent in the arm-circumferential direction, and thus, the display panel 3 can be fixed at a desired position on the forearm. In addition, as a wide overlapping margin of the hand portion 1h is provided together with the hook-and-loop fastener thereon, it is possible to connect the hand portion 1h and the forearm portion 1a by the shift in the arm axis direction, and thus, it is possible to adjust the length in the arm axis direction of the hand portion 1h in accordance with the length of the user's hand.

The reading device 10 may be worn on a right arm of the user, and for this purpose, the left and right are switched in a plan view (see FIG. 3A). In addition, the reading device 10 can be used for both the left and right by providing only the single cylindrical portion $1r_1$ in the hand portion 1h such that the mounting body 1 engages with one index finger as described above and allowing the display panel 3 to have the automatic rotation function of the screen display or setting the screen display to a desired direction by an input operation. When worn on the right arm, the trigger button 2s is arranged on the side surface of the index finger facing the middle finger, and thus, the trigger button 2s is pressed by, for example, pressing the index finger against the middle finger with the thumb. In addition, it is preferable that the electronic circuit board 4 be built in the display panel 3 such that the electronic circuit board 4 and the wiring 72 are not arranged on the inner side of the forearm.

The present invention is not limited to the above embodiment, and modifications can be made within a range not departing from a gist of the present invention.

What is claimed is:

1. A wearable electronic device comprising:
   a reading section configured to read optical information;
   a display section configured to display information read by the reading section;
   an electronic circuit board provided with a control unit that controls the reading section and the display section;
   a power supply unit configured to supply power to the reading section or the display section; and
   a mounting section having at least a part formed of a flexible member and configured to support the power supply unit, the electronic circuit board, the display section, and the reading section,
   wherein the electronic circuit board is arranged between the display section and the power supply unit, and
   wherein the mounting section is configured such that, when the mounting section is worn on an arm of a user, (i) the display section is fixed to a side surface of a forearm close to a thumb, (ii) the power supply unit is fixed to a side surface of the forearm close to a little finger, and (iii) the reading section is fixed to one of a back of a hand and a back of a finger.

2. The wearable electronic device according to claim 1, wherein the display section is arranged on the mounting section such that a longitudinal direction is a wrist-elbow direction of the forearm.

3. The wearable electronic device according to claim 1, wherein:
   the mounting section is fixedly worn on the arm at least at both ends in a direction along a wrist-elbow direction of the forearm, and
   one of the both ends is engaged with one finger and the other of the both ends is fixed to the forearm.

4. The wearable electronic device according to claim 3, wherein the mounting section has annular members that are annular or connectable to be annular and that are configured to be wound around the one finger and the forearm at the both ends.

5. The wearable electronic device according to claim 3, wherein:
   the mounting section is further fixedly mounted on the arm at an intermediate portion between the both ends,
   the intermediate portion is fixed to one of a wrist and the forearm, and
   the display section is arranged between the intermediate portion of the mounting section and the other of the both ends.

6. The wearable electronic device according to claim 5, wherein the mounting section includes an intermediate annular member, which is annular or connectable to be annular and which is configured to be wound around and fixed to the one of the wrist and the forearm, at the intermediate portion.

7. The wearable electronic device according to claim 1, wherein the reading section is arranged on the mounting section so as to read optical information facing an opposite side of a side where the display section is arranged with respect to the reading section.

8. The wearable electronic device according to claim 1, wherein:
   the display section and the reading section are arranged to be separated from each other in one direction,
   the mounting section has annular members that are annular or connectable to be annular at least at both ends in the one direction, and
   the annular member close to the reading section is provided on an extension in the one direction from the reading section and has an inner diameter smaller than an inner diameter of the annular member close to the display section.

9. The wearable electronic device according to claim 8, wherein:
   the mounting section has an intermediate annular member, which is annular or connectable to be annular and an axial direction of which is along the one direction, at a position sandwiching the display section with the annular member close to the display section in the one direction, and
   the intermediate annular member has an inner diameter larger than the inner diameter of the annular member close to the reading section and smaller than the inner diameter of the annular member close to the display section.

10. The wearable electronic device according to claim 8, wherein the display section is arranged on the mounting section such that a longitudinal direction is the one direction.

11. The wearable electronic device according to claim 8, wherein the reading section is arranged on the mounting section such that a reading direction is the one direction.

12. The wearable electronic device according to claim 1, wherein when the mounting section is worn on an arm of a user, the electronic circuit board is fixed to a back surface of a forearm located on a same side as the back of the hand.

13. The wearable electronic device according to claim 12, wherein:
   the reading section is fixed to the back of a finger, and
   the electronic circuit board and the reading section is connected by a wiring disposed between the back surface of the forearm and the back of the finger.

14. The wearable electronic device according to claim 1, wherein:
   the mounting section includes a forearm portion to which the power supply unit, the electronic circuit board and the display section are fixed, and a hand portion to which the reading section is fixed, and
   stretchability of the hand portion is higher than the forearm portion.

* * * * *